United States Patent
Emmons et al.

(10) Patent No.: US 9,996,507 B2
(45) Date of Patent: *Jun. 12, 2018

(54) GEO-CULTURAL INFORMATION BASED DYNAMIC CHARACTER VARIANT RENDERING

(71) Applicant: International Business Machines Corporation, Armonk, NY (US)

(72) Inventors: John C. Emmons, Austin, TX (US); Denise M. Genty, Austin, TX (US); Su Liu, Austin, TX (US); Shunguo Yan, Austin, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days. days.

This patent is subject to a terminal disclaimer.

(21) Appl. No.: 14/751,326

(22) Filed: Jun. 26, 2015

(65) Prior Publication Data
US 2016/0378722 A1    Dec. 29, 2016

(51) Int. Cl.
*G06T 11/20* (2006.01)
*G06F 17/22* (2006.01)

(52) U.S. Cl.
CPC ...... *G06F 17/2223* (2013.01); *G06F 17/2217* (2013.01)

(58) Field of Classification Search
CPC .......................... G06F 17/5004; G06F 17/2223
USPC ........................................................ 345/427
See application file for complete search history.

(56) References Cited

U.S. PATENT DOCUMENTS

| | | | |
|---|---|---|---|
| 7,191,114 B1 | 3/2007 | Murray et al. | |
| 8,094,940 B2 | 1/2012 | Chen et al. | |
| 8,176,128 B1 | 5/2012 | Batty et al. | |
| 2003/0197736 A1* | 10/2003 | Murphy | G06F 3/0236 715/780 |
| 2003/0202832 A1* | 10/2003 | Lorenzo | G06F 3/0233 400/103 |
| 2004/0125152 A1* | 7/2004 | Sommers | G06F 3/0236 715/856 |
| 2006/0181532 A1 | 8/2006 | Ravindra et al. | |

(Continued)

OTHER PUBLICATIONS

Wikipedia; Han unification, https://en.wikipedia.org/wiki/Han_unification, May 6, 2015.

(Continued)

*Primary Examiner* — Javid A Amini
(74) *Attorney, Agent, or Firm* — Garg Law Firm, PLLC; Rakesh Garg; Steven Bennett

(57) ABSTRACT

For dynamically changing a rendering of content, the content including a textual character is received at a mobile device. An encoding of the textual character uses a first code point according to a character encoding standard. The mobile device's presence at a geographical location is detected. The mobile device is associated with a user. A variant selection rule is selected at the device. The variant selection rule specifies a location based condition to select a variant corresponding to the textual character. A variant is selected at the device according to the variant selection rule, a variant mapping corresponding to the first code point. The variant mapping includes the variant. The encoding of the textual character is replaced at the device with an encoding of the variant in the rendering of the content.

13 Claims, 5 Drawing Sheets

(56) References Cited

U.S. PATENT DOCUMENTS

| | | | |
|---|---|---|---|
| 2006/0230350 A1* | 10/2006 | Baluja | G06F 3/0237 715/700 |
| 2009/0179780 A1* | 7/2009 | Tambe | G06F 3/0237 341/23 |
| 2009/0231361 A1 | 9/2009 | Schieltz et al. | |
| 2012/0124067 A1* | 5/2012 | Liu | G06Q 10/105 707/758 |
| 2012/0209866 A1 | 8/2012 | Liu et al. | |
| 2012/0293935 A1* | 11/2012 | Sherlock | G06F 1/163 361/679.03 |
| 2013/0027406 A1* | 1/2013 | Liu | G06F 17/214 345/467 |
| 2013/0046544 A1* | 2/2013 | Kay | G06F 3/04883 704/275 |
| 2016/0041626 A1* | 2/2016 | Liu | G06F 3/018 341/28 |
| 2016/0042059 A1* | 2/2016 | Liu | G06F 3/018 707/769 |

OTHER PUBLICATIONS

Unicode.Org; Unicode Character Database, http://unicode.org/Public/UCD/latest/ucd/StandardizedVariants.html, 1996-2015.
Uniocode.Org; Chart for the Hanyo-Denshi collection of the Unicode ideographic variation database, Mar. 2, 2012, 2007-2012.
Uniocode.Org; Chart for the Adobe-Japan 1 collection of the Unicode ideographic variation database, Mar. 2, 2012, 2007-2012.

* cited by examiner

*FIGURE 3*

TABLE-1: EXAMPLE OF HANZI VARIANTS
(VARIANT TYPE: VARIANTS WITH DIFFERENT CODE POINT, VDCP)
302

| DIFFERENT CODE POINTS, MAINLAND CHINA LANGUAGE TAG 304 | DIFFERENT CODE POINTS, TAIWAN LANGUAGE TAG 306 | DIFFERENT CODE POINTS, HONG KONG LANGUAGE TAG 308 | DIFFERENT CODE POINTS, JAPANESE LANGUAGE TAG 310 |
|---|---|---|---|
| 户尸户 314 | 户尸户 316 | 户尸户 318 | 户尸户 320 |
| 鳥為为 | 鳥為为 | 鳥為为 | 烏為为 |
| 强強 | 强強 | 强強 | 强強 |
| 書畫画 | 書畫画 | 書畫画 | 書畫画 |
| 線緣线 | 線緣线 | 線緣线 | 線緣线 |

TABLE-2: EXAMPLES OF HANZI VARIANTS
(VARIANT TYPE: GLYPHS WITH SAME CODE POINT, GSCP)
352

| MAINLAND CHINA LANGUAGE TAG 364 | TAIWAN LANGUAGE TAG 356 | HONG KONG LANGUAGE TAG 358 | JAPANESE LANGUAGE TAG 360 |
|---|---|---|---|
| 刃 | 刃 366 | 刃 368 | 刃 370 |
| 令 | 令 | 令 | 令 |
| 鎌 | 鎌 | 鎌 | 鎌 |
| 骨 | 骨 | 骨 | 骨 |
| 諸 | 諸 | 諸 | 諸 |
| 海 | 海 | 海 | 海 |
| 雪 | 雪 | 雪 | 雪 |
| 起 | 起 | 起 | 起 |

US 9,996,507 B2

GEO-CULTURAL INFORMATION BASED DYNAMIC CHARACTER VARIANT RENDERING

TECHNICAL FIELD

The present invention relates generally to a system, and computer program product for presenting encoded content. More particularly, the present invention relates to a system, and computer program product for geo-cultural information based dynamic character variant rendering.

BACKGROUND

A computer keyboard and display are common devices for providing computer input and output, respectively. A keyboard is language-specific such that the keys on the keyboard can be pressed to directly input only those characters in the keyboard's language that are assigned to those keys. For inputting other characters, a user has to press a combination of keys on the keyboard.

Many languages have alphabets that are too large to accommodate on a keyboard. Many languages have modifiers, which when applied to a character in the language's alphabet produce additional characters in the language's alphabet. Furthermore, the alphabets of many languages do not use characters to form words in the manner of the English language, but have a collection of characters that represent words. Thus, providing computer input in many languages is not as simple as pressing the letter-keys on the keyboard but an indirect process of pressing a combination of keys to generate characters not available as keys on the keyboard.

A display is also language-specific. In order to display characters in certain languages, certain scripts, fonts, and rendering directions can be selected for proper rendering of the characters. Generally, for rendering characters of a given language, specific fonts are installed and presented on the computer display.

Text in digital content is encoded in a variety of ways for capturing from an input method, storage in a data storage system, and rendering on a user interface in a desirable manner. For example, Unicode is a common encoding standard for encoding and handling of text characters from a set of language scripts in digital textual content.

Presently, Unicode encodes or codifies over one hundred thousand characters from over one hundred languages. Generally, in Unicode and other character encoding standards, each character represented in the standard is assigned an encoded value called a code point. For example, in Unicode standard UTF-8 uses one byte—eight bits—to encode the code points of the characters represented in UTF-8. UTF-16 similarly uses two bytes for encoding the code points of the characters represented therein.

A code point in an encoding standard is unique to a specific character in a specific language represented in that encoding standard. For example, in Unicode, a code point comprises an alphanumeric string that can be generated on commonly used keyboard configurations, such as an English language QWERTY keyboard.

As an example, to provide a Unicode code point, the user or an application generally supplies an indication that the alphanumeric string following the indication is a Unicode code point and should be translated using a Unicode table to generate a character. For example, in some implementations, to provide a Unicode code point using a QWERTY keyboard, a user can press the ALT key, keep the ALT key depressed while entering the code point, and release the ALT key when the code point entry is complete.

An application called an input method application, or simply "input method" or "IMA", intercepts the Unicode code point that the user enters. The IMA looks up a Unicode table to find the character that matches the code point that the user entered. The IMA supplies the character to a target application for which the user is supplying the input.

A character variant is an alternate representation of a character within the given encoding standard. There are two types of character variants—Variants with Different Code Points (VDCP) and Glyphs with Same Code Point (GSCP). A variant is a VDCP type variant when the original character and the variant have different code points, with the same or different language tags, within the encoding standard. A variant is a GSCP type variant when the glyph—a manner of scripting or otherwise visually representing the character—of the original character and the variant has the same code point but different language tags in the encoding standard.

SUMMARY

The illustrative embodiments provide a system, and computer program product for geo-cultural information based dynamic character variant rendering. An embodiment receives, at a device, the content including a textual character, an encoding of the textual character using a first code point according to a character encoding standard. The embodiment detects, at the device, that the device is present at a geographical location, the mobile device being associated with a user. The embodiment selects, at the device, a variant selection rule, wherein the variant selection rule specifies a location based condition to select a variant corresponding to the textual character. The embodiment selects, at the device, according to the variant selection rule, a variant mapping corresponding to the first code point, the variant mapping including the variant. The embodiment replaces, at the device, in the rendering of the content, the encoding of the textual character with an encoding of the variant.

Another embodiment includes a computer readable article of manufacture embodying computer readable instructions which, when executed, cause a computer to carry out steps of a method for dynamically changing a rendering of content.

Another embodiment includes a data processing system for dynamically changing a rendering of content.

BRIEF DESCRIPTION OF THE SEVERAL VIEWS OF THE DRAWINGS

The novel features believed characteristic of the invention are set forth in the appended claims. The invention itself, however, as well as a preferred mode of use, further objectives and advantages thereof, will best be understood by reference to the following detailed description of the illustrative embodiments when read in conjunction with the accompanying drawings, wherein:

FIG. 3 depicts example s of variant mapping tables in accordance with an illustrative embodiment;

DETAILED DESCRIPTION

Figure 1:
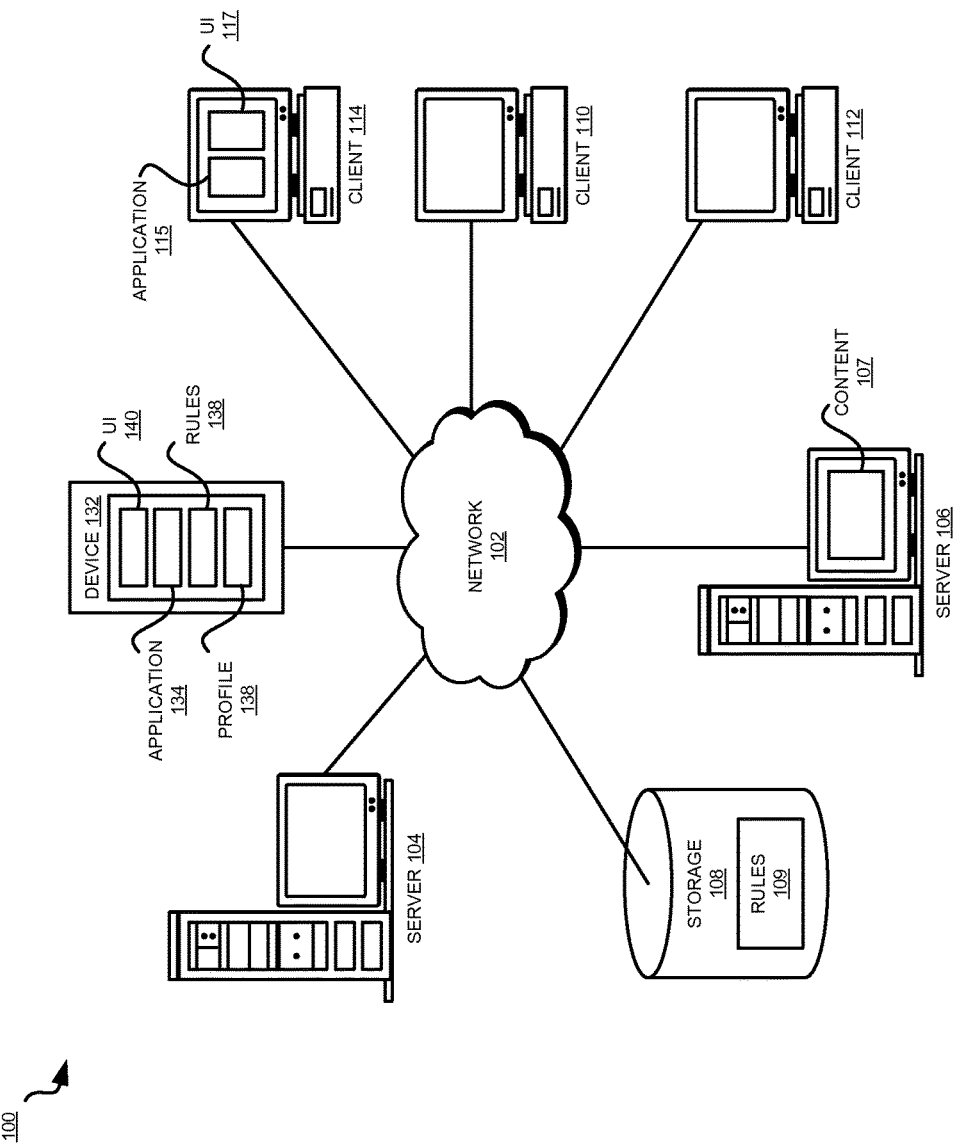
FIG. 1 depicts a block diagram of a network of data processing systems in which illustrative embodiments may be implemented.

The illustrative embodiments recognize that language usage is geography-dependent. In other words, the illustrative embodiments recognize that a language of communication changes from place to place, and affects how information is communicated to a user. The illustrative embodiments recognize that even if the underlying language grammatically, semantically, or principally remains the same from place to place, the characters used in that language can change.

The illustrative embodiments further recognize that while traveling from one geographical location to another, the location of a user affects how information is presented to the user in that location. For example, mainland China and Taiwan area both use the Chinese language. But, the preferred character representations for communicating a concept in mainland China are from simplified Chinese—a preference in mainland China—whereas the preferred character representations for communicating a concept in Taiwan area are from traditional Chinese—a preference in Taiwan area. Thus, a user who travels from mainland China to Taiwan area ends up still using the variants from simplified Chinese in Taiwan area, on a user interface, be it for reading local news, or typing an email to a local entity, or for other data handling purposes.

Similar problems arise when a user travels from Taiwan area to Japan, for example, because Traditional Chinese and Japanese character sets share many similar characters. As another example, a user traveling from Pakistan to Egypt sees similar problems in the Arabic script as well. Some regional Arabic script and characters may have the Persian influence whereas the Arabic script and characters in other regions have Egyptian, African, Urdu, and other influences.

The illustrative embodiments recognize that regional variations in languages, dialects, preferences, cultures, give rise to variations in character representations within a language as well as across different languages. Such variations in the characters used in a geographic region form variants in a character encoding standard.

The illustrative embodiments recognize that presently, copies of the content are statically encoded differently for different locales where the content will be served. In other words, the content encoding is changed in copies of the content to adapt a copy of the content to a geographic region. For example, in a web server, content sent to a user who registered or subscribed from mainland China is encoded specifically using the code points of characters in simplified Chinese, and a different version of the same content that is targeted at another user who registered from Taiwan area is encoded specifically using the code points of characters in traditional Chinese.

A user from mainland China is subscribed to, or otherwise configured to receive the simplified Chinese encoding of the content. In this locale based manner, the user continues to receive the content encoded in simplified Chinese even if the user travels to Taiwan area.

The illustrative embodiments recognize that the specifically regionally encoded content is static, and cannot change with the changing geo-cultural information that becomes related to the user at different times. Geo-cultural information is information that represents a geographic location and cultural influences of that geographic location on the language of a given content. Dynamic geo-cultural information is geo-cultural information that changes as the location of a user changes, for example, as a result of the user traveling from one geographical location to another.

The illustrative embodiments recognize that presently, digital content, particularly textual content, cannot be dynamically adapted to use character variants suited to a dynamic geo-cultural information, such as according to a Global Positioning System (GPS) location of the user at any given time. The illustrative embodiments recognize that because a user's location, and therefore a location of a device associated with the user, changes in real-time, statically encoded content is unsuitable for dynamic rendering of the character variants in the content depending upon the location where the user might be at any given time. For example, presently, if a user from mainland China travels to Japan, simplified Chinese content rendered on the user's device cannot be rendered using Japanese variants while the user is in Japan.

The illustrative embodiments used to describe the invention generally address and solve the above-described problems and other problems related to the presentation of digital content according to dynamic geo-cultural information and preferences. The illustrative embodiments provide a system, and computer program product for geo-cultural information based dynamic character variant rendering.

The illustrative embodiments are described using Unicode encoding only as a non-limiting example for the purposes of the clarity of the description. Other encoding standards can similarly be used in conjunction with an embodiment within the scope of the illustrative embodiments. Furthermore, the illustrative embodiments are described using certain languages and corresponding character sets only as a non-limiting example for the purposes of the clarity of the description. Other languages and their characters can similarly be used in conjunction with an embodiment within the scope of the illustrative embodiments.

An embodiment receives content in which certain characters have been encoded using a certain character set of a certain language. The embodiment receives a dynamically generated geo-cultural update. For example, one embodiment receives a present location of a device on which the embodiment is executing, and correlates the location with any geographical and/or cultural preferences of the user of the device relative to that location.

The embodiment identifies a character in the content where the character has one or more character variants in the encoding standard. The identified character in the existing encoding of the content is called a variant candidate character, or simply a candidate character.

An embodiment maintains mappings of the various variants of a character with one another. For example, one embodiment maintains a mapping table in which the various VDCP variants of a character occupy different columns in a row. Such an example VDCP mapping table can include any number of rows to represent mappings between of VDCP variants of any number of characters represented in a given encoding. Note that different columns can contain variants from different languages, and when applicable, variants from the same language can also occupy separate columns in a VDCP mapping table. More than one VDCP mapping table can be created, for example, to have different configurations of columns, for different languages, or simply to have manageable number of rows in each table.

Similarly, the embodiment maintains a mapping table in which the various GSCP variants of a character occupy different columns in a row. Such an example GSCP mapping table can include any number of rows to represent mappings between of GSCP variants of any number of characters represented in a given encoding. More than one GSCP mapping table can be created, for example, to have different configurations of columns, for different languages, or simply to have manageable number of rows in each table.

An embodiment selects a variant of the variant candidate character using a variant mapping table and a variant selection rule. A variant selection rule is logic or condition to select one of the variants of a variant candidate character from a variant mapping table.

For example, suppose that an example VDCP mapping table includes four columns for variants in traditional Chinese, simplified Chinese, Korean, and Japanese. A row in this example VDCP mapping table includes one or more character(s) or expression having a particular meaning in traditional Chinese in one column, one or more character(s) or expression having the same particular meaning in simplified Chinese in the second column, one or more character(s) or expression having the same particular meaning in Korean in the third column, and one or more character(s) or expression having the same particular meaning in Japanese in the fourth column.

Assume only as a non-limiting example that a user's locale is set to mainland China on the user's device, and that the user's language default is set to simplified Chinese. One simple example variant selection rule may specify that if the user's (device's) location is in mainland China, the simplified Chinese variant should be used; if the user's (device's) location is in Taiwan area, the traditional Chinese variant should be used; if the user's (device's) location is in South Korea, the Korean variant should be used; and if the user's (device's) location is in Japan, the Japanese variant should be used.

Another example variant selection rule may specify that if the user's (device's) location is in mainland China, the simplified Chinese variant should be used; if the user's (device's) location is anywhere else, the traditional Chinese variant should be used. Another example variant selection rule may specify that if the user's (device's) location is in Taiwan area on a weekend, the simplified Chinese variant should be used; if the user's (device's) location is in on a weekday, the traditional Chinese variant should be used; and everywhere else on any day, simplified Chinese should be used.

Another simple example variant selection rule may specify that if the user's (device's) location is not in mainland China, and unless the location is in Taiwan area, South Korea, or Japan, traditional Chinese variant should be used as default for content received or sent in email communications, and simplified Chinese variants should be used in web-browser content; but if the user's (device's) location is in Taiwan area, the traditional Chinese variant should be used for all content; if the user's (device's) location is in South Korea, the Korean variant should be used for content communicated with local persons and simplified Chinese should be used for content communicated with mainland Chinese users; and if the user's (device's) location is in Japan, the Japanese variant should be used in all communications.

In a similar manner, an embodiment can also select a GSCP variant of the variant candidate character using a GSCP variant mapping table and a variant selection rule. For example, suppose that an example GSCP mapping table includes four columns for variants in traditional Chinese, simplified Chinese, Korean, and Japanese where all variants have the same code point but different language tags. A row in this example VDCP mapping table includes a character having a particular code point in traditional Chinese in one column, a character having the same code point in simplified Chinese in the second column, a character having the same code point in Korean in the third column, and a character having the same code point in Japanese in the fourth column.

Again, assume only as a non-limiting example that a user's locale is set to mainland China on the user's device, and that the user's language default is set to simplified Chinese. One simple example variant selection rule may specify that if the user's (device's) location is in mainland China, the simplified Chinese variant should be used from the GSCP mapping table; if the user's (device's) location is in Taiwan area, the traditional Chinese variant should be used from the GSCP mapping table; if the user's (device's) location is in South Korea, the Korean variant should be used from the GSCP mapping table; and if the user's (device's) location is in Japan, the Japanese variant should be used from the GSCP mapping table.

Other examples of variant selection rules described above would also operate in a similar manner with a GSCP mapping table as well. These example variants and variants tables are described only as non-limiting examples. From this disclosure, those of ordinary skill in the art will be able to construct and use other forms of VDCP mappings and GSCP mappings, and the same are contemplated within the scope of the illustrative embodiments.

These example variant selection rules and the example manners of using them in conjunction with a VDCP mapping table or a GSCP mapping table are not intended to be limiting on the illustrative embodiments. As can be seen from these examples, very simple to very complex variant selection rules can be created depending upon the needs of a particular implementation. Such other rules are contemplated within the scope of the illustrative embodiments.

A profile of the user enables an embodiment to select a suitable variant selection rule. For example, a user profile describing a user's language preferences, including variants preferences, may be configured for use with the device.

Once an embodiment selects a variant of the variant candidate using the selected variant selection rule and a variant mapping, the embodiment replaces the variant candidate character with the variant from the mapping in satisfaction of the rule. In one embodiment, the replacing occurs at the time of rendering the variant candidate character using a user interface (UI) of the device such that the selected variant is rendered using the UI instead of rendering the variant candidate character, even though the received content included the encoding of the variant candidate character, not the encoding of the variant that is rendered. For example, the variant replacement occurs in a display buffer on the fly but the code points in the original content remain unchanged.

Note that the replacing does not modify the content but only a rendering of the content. The content with the encoding of the VDCP-type variant candidate character replaced with the encoding of the selected variant, such as by replacing a code point, a language tag, or both, is referred to as globalized content. The embodiment renders the globalized content using the UI.

A method of an embodiment described herein, when implemented to execute on a device or data processing system, comprises substantial advancement of the functionality of that device or data processing system in rendering globalized content according to the dynamic geo-cultural information of a user. For example, prior-art pre-configures content with different encoding for different regions, and a specific encoding of the content is delivered to a user according to the user's preset locale. An embodiment dynamically determines the user's assesses the user's location and the associated geo-cultural preferences at any given time. Using this dynamically determined information, an embodiment selects a geo-culturally preferred variant for each of one or more candidate characters encoded in a given content. The embodiment replaces the encoding of the candidate characters in the content with the selected encoding of corresponding variants for rendering. Such manner of changing the encoding of characters in a given content at rendering regardless of the received encoding of the content is unavailable in presently available devices or data processing systems. Thus, a substantial advancement of such devices or data processing systems by executing a method of an embodiment is achieved by making the content match a geo-cultural preference according to the dynamically changing geographic location of the user whose locale settings may remain unchanged.

The illustrative embodiments are described with respect to certain content, characters, encoding, standards, locale, languages, variants, locations, geo-cultural information, preferences or settings, rules, profiles, devices, data processing systems, environments, components, and applications only as examples. Any specific manifestations of these and other similar artifacts are not intended to be limiting to the invention. Any suitable manifestation of these and other similar artifacts can be selected within the scope of the illustrative embodiments.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention. Where an embodiment is described using a mobile device, any type of data storage device suitable for use with the mobile device may provide the data to such embodiment, either locally at the mobile device or over a data network, within the scope of the illustrative embodiments.

The illustrative embodiments are described using specific code, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. For example, other comparable mobile devices, structures, systems, applications, or architectures therefor, may be used in conjunction with such embodiment of the invention within the scope of the invention. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Figure 2:
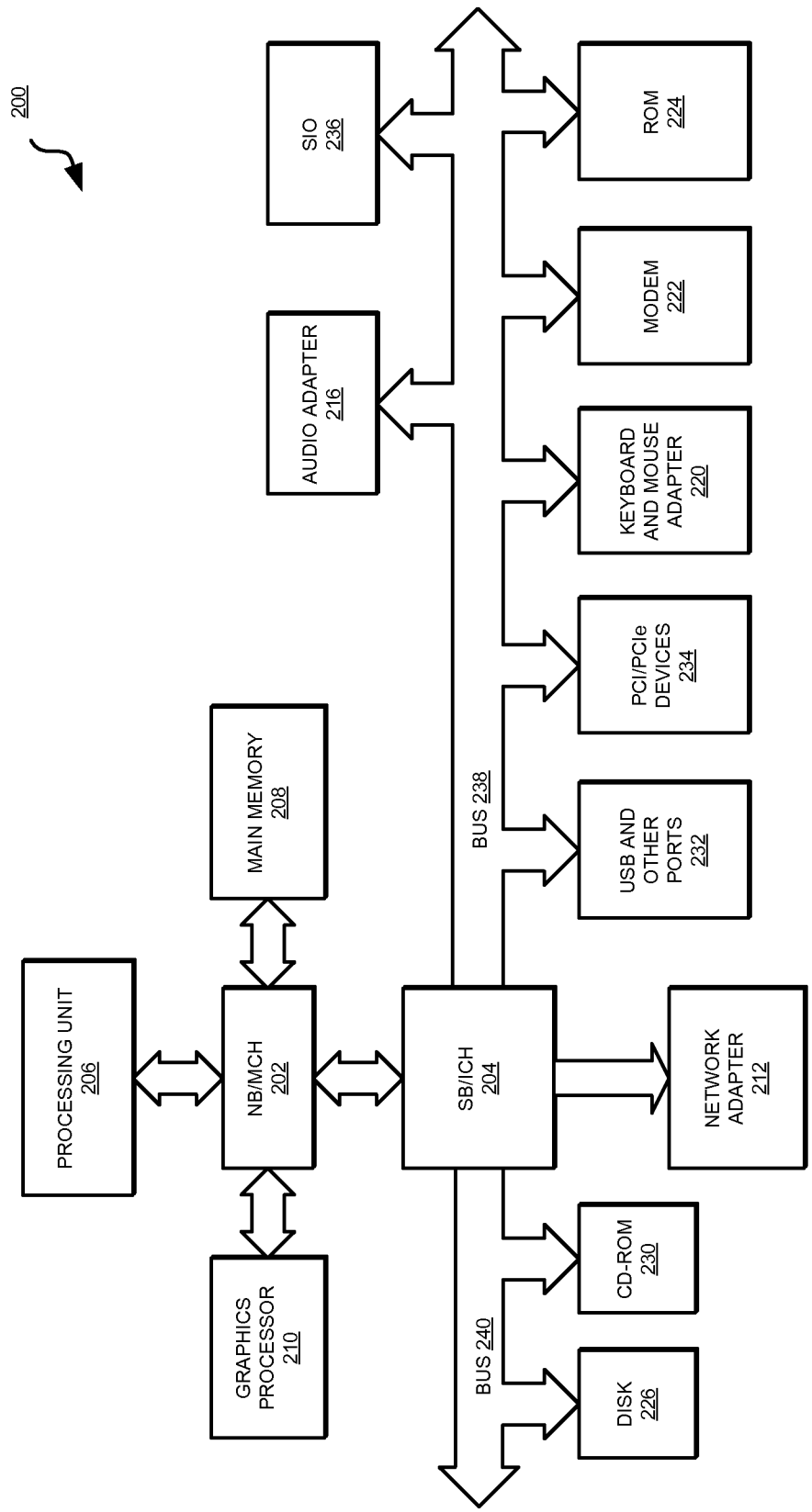
FIG. 2 depicts a block diagram of a data processing system in which illustrative embodiments may be implemented.

With reference to the figures and in particular with reference to FIGS. 1 and 2, these figures are example diagrams of data processing environments in which illustrative embodiments may be implemented. FIGS. 1 and 2 are only examples and are not intended to assert or imply any limitation with regard to the environments in which different embodiments may be implemented. A particular implementation may make many modifications to the depicted environments based on the following description.

FIG. 1 depicts a block diagram of a network of data processing systems in which illustrative embodiments may be implemented. Data processing environment 100 is a network of computers in which the illustrative embodiments may be implemented. Data processing environment 100 includes network 102. Network 102 is the medium used to provide communications links between various devices and computers connected together within data processing environment 100. Network 102 may include connections, such as wire, wireless communication links, or fiber optic cables.

Clients or servers are only example roles of certain data processing systems connected to network 102 and are not intended to exclude other configurations or roles for these data processing systems. Server 104 and server 106 couple to network 102 along with storage unit 108. Software applications may execute on any computer in data processing environment 100. Clients 110, 112, and 114 are also coupled to network 102. A data processing system, such as server 104 or 106, or client 110, 112, or 114 may contain data and may have software applications or software tools executing thereon.

Only as an example, and without implying any limitation to such architecture, FIG. 1 depicts certain components that are usable in an example implementation of an embodiment. For example, servers 104 and 106, and clients 110, 112, 114, are depicted as servers and clients only as example and not to imply a limitation to a client-server architecture. As another example, an embodiment can be distributed across several data processing systems and a data network as shown, whereas another embodiment can be implemented on a single data processing system within the scope of the illustrative embodiments. Data processing systems 104, 106, 110, 112, and 114 also represent example nodes in a cluster, partitions, and other configurations suitable for implementing an embodiment.

Device 132 is an example of a device described herein. For example, device 132 can take the form of a smartphone, a tablet computer, a laptop computer, client 110 in a stationary or a portable form, a wearable computing device, or any other suitable device. Any software application described as executing in another data processing system in FIG. 1 can be configured to execute in device 132 in a similar manner. Any data or information stored or produced in another data processing system in FIG. 1 can be configured to be stored or produced in device 132 in a similar manner.

Server 106 serves content 107, which is encoded in a manner determined by server 106, to device 132, or any other device associated with a user, such as client 114. Application 134 in device 132 implements an embodiment described herein. Rules 136 are one or more variant selection rules and may be stored locally at device 132 (shown)

or accessible to device 132 over a data network (not shown). Application 134 uses rules 136 according to profile 138 to replace an encoding of a character in content 107 when content 107 is to be rendered using UI 140. Similar to device 132, client 114 is also an example of a device, such as a laptop computer, which may be associated with a user as the user changes locations. Application 115 in device 114 implements an embodiment described herein. Application 134 accesses rules 109 over a data network. Application 115 uses a rule 109 either according to a default setting or a configuration of the rule 109 itself, to replace an encoding of a character in content 107 when content 107 is to be rendered using UI 117. For example, a profile may not be needed if a rule 109 is configured to be triggered by default according to the location of device 132 or client 114.

Servers 104 and 106, storage unit 108, and clients 110, 112, and 114 may couple to network 102 using wired connections, wireless communication protocols, or other suitable data connectivity. Clients 110, 112, and 114 may be, for example, personal computers or network computers.

In the depicted example, server 104 may provide data, such as boot files, operating system images, and applications to clients 110, 112, and 114. Clients 110, 112, and 114 may be clients to server 104 in this example. Clients 110, 112, 114, or some combination thereof, may include their own data, boot files, operating system images, and applications. Data processing environment 100 may include additional servers, clients, and other devices that are not shown.

In the depicted example, data processing environment 100 may be the Internet. Network 102 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), or a wide area network (WAN). FIG. 1 is intended as an example, and not as an architectural limitation for the different illustrative embodiments.

Among other uses, data processing environment 100 may be used for implementing a client-server environment in which the illustrative embodiments may be implemented. A client-server environment enables software applications and data to be distributed across a network such that an application functions by using the interactivity between a client data processing system and a server data processing system. Data processing environment 100 may also employ a service oriented architecture where interoperable software components distributed across a network may be packaged together as coherent business applications.

With reference to FIG. 2, this figure depicts a block diagram of a data processing system in which illustrative embodiments may be implemented. Data processing system 200 is an example of a computer, such as servers 104 and 106, or clients 110, 112, and 114 in FIG. 1, or another type of device in which computer usable program code or instructions implementing the processes may be located for the illustrative embodiments.

Data processing system 200 is also representative of a data processing system or a configuration therein, such as data processing system in FIG. 1 in which computer usable program code or instructions implementing the processes of the illustrative embodiments may be located. Data processing system 200 is described as a computer only as an example, without being limited thereto. Implementations in the form of other devices, such as device 132 in FIG. 1, may modify data processing system 200, such as by adding a touch interface, and even eliminate certain depicted components from data processing system 200 without departing from the general description of the operations and functions of data processing system 200 described herein.

In the depicted example, data processing system 200 employs a hub architecture including North Bridge and memory controller hub (NB/MCH) 202 and South Bridge and input/output (I/O) controller hub (SB/ICH) 204. Processing unit 206, main memory 208, and graphics processor 210 are coupled to North Bridge and memory controller hub (NB/MCH) 202. Processing unit 206 may contain one or more processors and may be implemented using one or more heterogeneous processor systems. Processing unit 206 may be a multi-core processor. Graphics processor 210 may be coupled to NB/MCH 202 through an accelerated graphics port (AGP) in certain implementations.

In the depicted example, local area network (LAN) adapter 212 is coupled to South Bridge and I/O controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to South Bridge and I/O controller hub 204 through bus 238. Hard disk drive (HDD) or solid-state drive (SSD) 226 and CD-ROM 230 are coupled to South Bridge and I/O controller hub 204 through bus 240. PCI/PCIe devices 234 may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE), serial advanced technology attachment (SATA) interface, or variants such as external-SATA (eSATA) and micro—SATA (mSATA). A super I/O (SIO) device 236 may be coupled to South Bridge and I/O controller hub (SB/ICH) 204 through bus 238.

Memories, such as main memory 208, ROM 224, or flash memory (not shown), are some examples of computer usable storage devices. Hard disk drive or solid state drive 226, CD-ROM 230, and other similarly usable devices are some examples of computer usable storage devices including a computer usable storage medium.

An operating system runs on processing unit 206. The operating system coordinates and provides control of various components within data processing system 200 in FIG. 2. The operating system may be a commercially available operating system such as AIX® (AIX is a trademark of International Business Machines Corporation in the United States and other countries), Microsoft® Windows® (Microsoft and Windows are trademarks of Microsoft Corporation in the United States and other countries), Linux® (Linux is a trademark of Linus Torvalds in the United States and other countries), iOS™ (iOS is a trademark of Cisco Systems, Inc. licensed to Apple Inc. in the United States and in other countries), or Android™ (Android is a trademark of Google Inc., in the United States and in other countries). An object oriented programming system, such as the Java™ programming system, may run in conjunction with the operating system and provide calls to the operating system from Java™ programs or applications executing on data processing system 200 (Java and all Java-based trademarks and logos are trademarks or registered trademarks of Oracle Corporation and/or its affiliates).

Instructions for the operating system, the object-oriented programming system, and applications or programs, such as applications 115 and 134 in FIG. 1, are located on storage devices, such as hard disk drive 226, and may be loaded into at least one of one or more memories, such as main memory 208, for execution by processing unit 206. The processes of the illustrative embodiments may be performed by processing unit 206 using computer implemented instructions, which may be located in a memory, such as, for example, main memory 208, read only memory 224, or in one or more peripheral devices.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. In addition, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in North Bridge and memory controller hub 202. A processing unit may include one or more processors or CPUs.

The depicted examples in FIGS. 1-2 and above-described examples are not meant to imply architectural limitations. For example, data processing system 200 also may be a tablet computer, laptop computer, or telephone device in addition to taking the form of a mobile or wearable device.

With reference to FIG. 3, this figure depicts example s of variant mapping tables in accordance with an illustrative embodiment. Application 134 or application 115 in FIG. 1 maintains tables 302 and/or 352 in their respective devices.

Table 302 stored VDCP mappings of expressions comprising one or more characters that convey the same or similar meanings in one or more languages. Note that a variant character in table 302 can include one or more symbols to represent an expression in that language.

Only as a non-limiting example, column 304 contains variants with a language tag corresponding to the language used in mainland China. Column 306 contains variants with a language tag corresponding to the language used in Taiwan area. Column 308 contains variants with a language tag corresponding to the language used in Hong Kong area. Column 310 contains variants with a language tag corresponding to the Japanese language. More than one columns are possible for a single language when more than one variants are possible in that language for a given expression.

Each row includes one or more variants under corresponding one or more columns according to their language tags. The code points of the entries in different columns of the same row are different from one another. For example, row 312 includes variants 314, 316, 318, and 320 under columns 304, 306, 308, and 310, respectively. Each of variants 314, 316, 318, and 320 has a different code point in the encoding standard.

Table 352 stored GSCP mappings of characters that have the same code point but have different language tags. Only as a non-limiting example, column 354 contains variants with a language tag corresponding to the language used in mainland China. Column 356 contains variants with a language tag corresponding to the language used in Taiwan area. Column 358 contains variants with a language tag corresponding to the language used in Hong Kong area. Column 360 contains variants with a language tag corresponding to the Japanese language.

Each row includes one or more variants under corresponding one or more columns according to their language tags. The code points of the entries in different columns of the same row are the same. For example, row 362 includes variants 364, 366, 368, and 370 under columns 354, 356, 358, and 360, respectively. Each of variants 364, 366, 368, and 370 has the same code point but a different language tag in the encoding standard.

Figure 4:
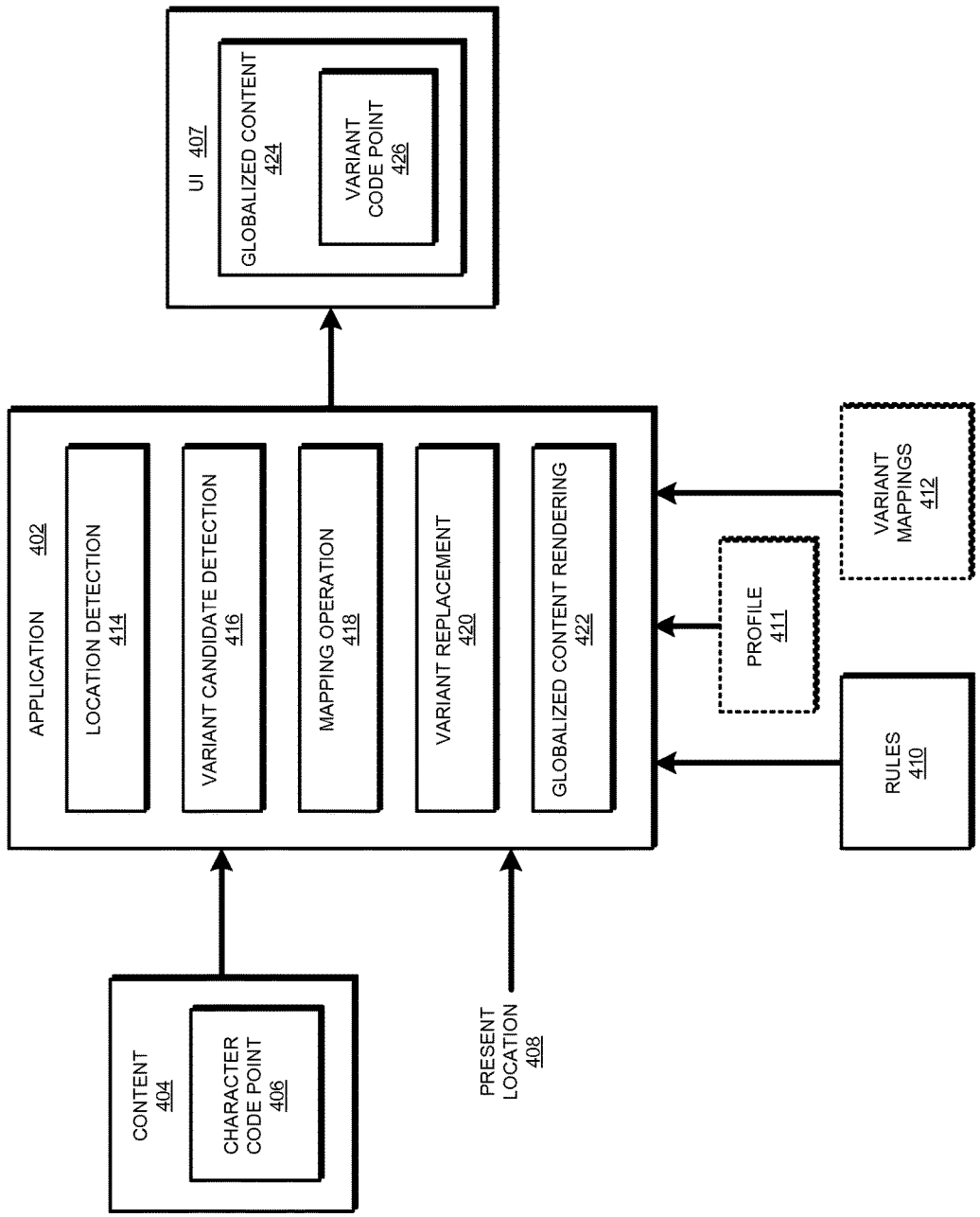
FIG. 4 depicts a block diagram of an example configuration for geo-cultural information based dynamic character variant rendering in accordance with an illustrative embodiment.

With reference to FIG. 4, this figure depicts a block diagram of an example configuration for geo-cultural information based dynamic character variant rendering in accordance with an illustrative embodiment. Application 402 is an example of application 134 or application 115 in FIG. 1.

Content 404 is an example of content 107 in FIG. 1, and includes code point 406 of an example candidate character. Application 402 receives content 404 for rendering using UI 407.

Present location 408 is a location at a given time, of the device (not shown) where application 402 is executing. Rules 410 include one or more variant selection rules, such as rules 136 or 109 in FIG. 1. Rules 410 may be stored in the device where application 402 is executing or may be available to the device over a data network.

Profile 411 is a profile of the user that is usable for selecting a rule from rules 410. Profile 411 is optional and may be omitted with some implementations of the rules as described herein.

Variant mappings 412 includes one or more mapping data structures, such as variant mapping tables 302, 352, or both, in FIG. 3. Preferably, variant mappings 412 are stored in the device where application 402 is executing, but can also be made available to the device over a data network.

Component 414 detects a location of the device according to location input 408. Component 416 detects a candidate character, such as candidate character 406 in content 404, which can be replaced with a variant that is suitable for use at the location by component 414.

Component 418 selects a mapping corresponding to candidate character 406 in variant mappings 412. Particularly, component 418 selects a rule from rules 410, optionally by using profile 411. Using the selected rule 410, component 418 selects a variant mapping corresponding to candidate character 406 from variant mappings 412.

Component 420 uses the variant from the selected variant mapping 412 to replace the code point of candidate character 406 in preparation for rendering. The variant of candidate character 406 in the selected variant mapping 412 is geo-culturally suitable for use according to the location of the device and selected rule 410. Using UI 407, component 422 renders globalized content 424 in which the code point of candidate character 406 has been replaced with code point of the selected variant 426.

While the depiction in this figure shows one character being replaced with a variant, the illustrative embodiments are not limited to replacing any specific number of code points. From this disclosure, those of ordinary skill will be able to replace any number of code points similar to code point 406 with corresponding code points 426 of the corresponding variants.

Figure 5:
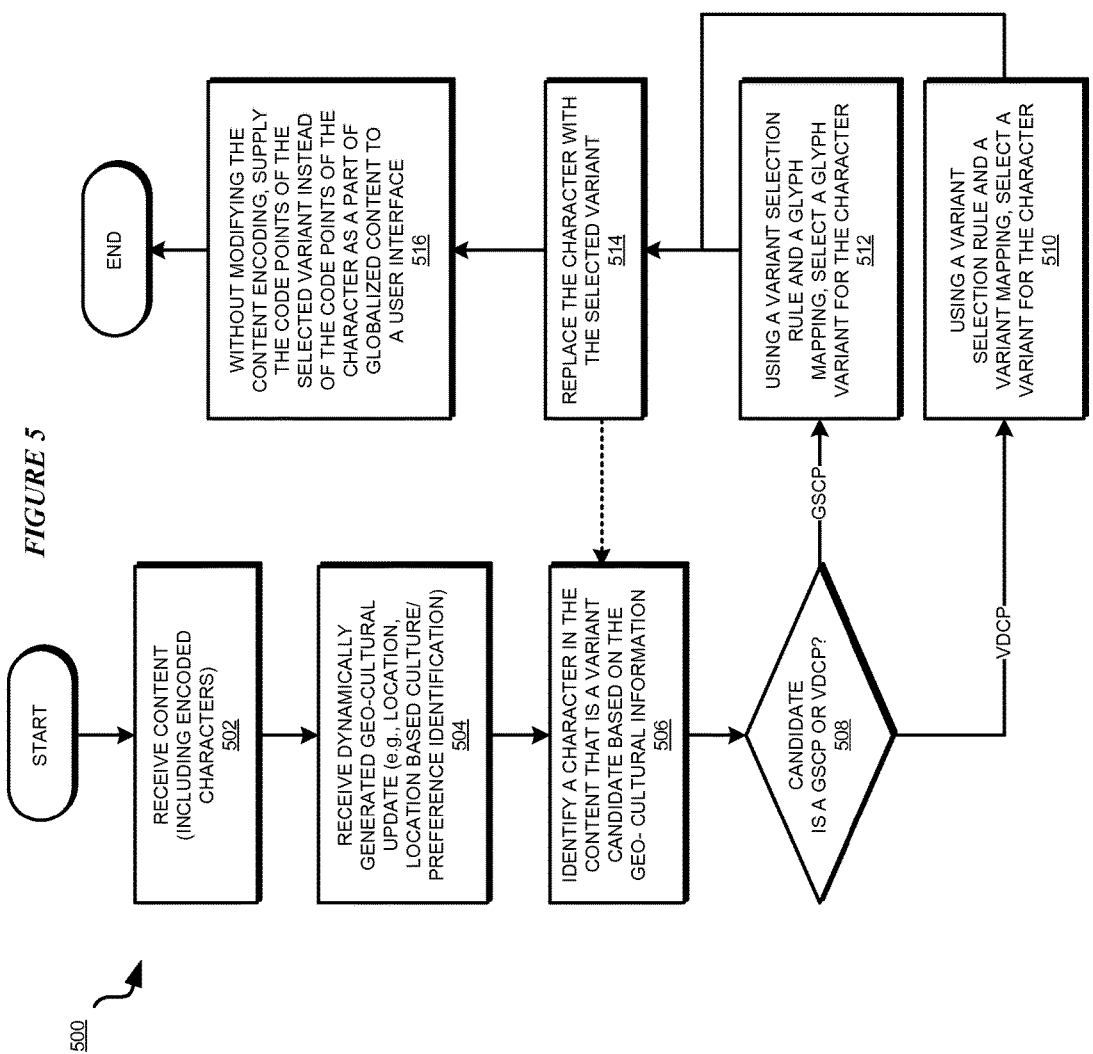
FIG. 5 depicts a flowchart of an example process for geo-cultural information based dynamic character variant rendering in accordance with an illustrative embodiment.

With reference to FIG. 5, this figure depicts a flowchart of an example process for geo-cultural information based dynamic character variant rendering in accordance with an illustrative embodiment. Process 500 can be implemented in application 402 in FIG. 4.

The application receives content, which includes encoded characters (block 502). The application receives dynamically generated geo-cultural update (block 504). For example, the application may receive or determine a GPS location of the device and identify a location-based cultural or preference identification, such as from a profile.

The application identifies a character, specifically a code point of a character, in the content, where the character is a candidate character based on the geo-cultural update (block 506). The application determines whether the candidate character has a GSCP variant or a VDCP variant in the variant mappings (block 508).

If the candidate character has a VDCP variant ("VDCP" path of block 508), the application uses a variant selection rule and a VDCP variant mapping corresponding to the candidate character to select a VDCP variant for the candidate character (block 510). The application proceeds to block 514 thereafter. If the candidate character has a GSCP variant ("GSCP" path of block 508), the application uses a variant selection rule and a GSCP variant mapping corresponding to the candidate character to select a GSCP variant for the candidate character (block 512).

The application replaces the code point of the candidate character with the code point of the selected VDCP or GSCP variant (block 514). The application repeats blocks 506-514 as many times as needed to replace one or more candidate character code points in this manner.

Once all candidate character code points in the received content have been replaced in this manner for rendering, the application supplies for rendering the code points of the selected variants instead of the code points of the candidate characters as a part of globalized content to a UI (block 516). The application ends process 500 thereafter.

Thus, a system or apparatus, and computer program product are provided in the illustrative embodiments for geo-cultural information based dynamic character variant rendering. Where an embodiment or a portion thereof is described with respect to a type of device, the system or apparatus, the computer program product, or a portion thereof, are adapted or configured for use with a suitable and comparable manifestation of that type of device.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A non-transitory computer readable medium embodying computer readable instructions which, when executed, cause a computer to carry out steps of a method for dynamically changing a rendering of content, the method comprising:
   receiving, at a device, the content including a textual character, an encoding of the textual character using a first code point according to a character encoding standard;
   detecting, at the device, that the device is present at a geographical location, the device being associated with a mobile user;
   selecting, at the device, a variant selection rule, wherein the variant selection rule specifies a location based condition to select a variant corresponding to the textual character, wherein the variant conveys one of (i) a similar meaning in a different language than a language of the textual character, and (ii) has the same first code point but is associated with a different language than that of the textual character;
   selecting, at the device, according to the variant selection rule, a variant mapping corresponding to the first code point, the variant mapping including the variant; and
   replacing, at the device, in the rendering of the content, the encoding of the textual character with an encoding of the variant.

2. The non-transitory computer readable medium embodying computer readable instructions of claim 1 embodying instructions which, when executed, cause the computer to carry out the method, wherein the encoding of the textual character corresponds to a locale setting of the device, further comprising:
   detecting that the device has moved to a second location;
   receiving, at the second location, the content with the encoding of the textual character; and
   rendering the textual character as a second variant corresponding to the second location by replacing the encoding of the textual character with the encoding of the second variant.

3. The non-transitory computer readable medium embodying computer readable instructions of claim 1 embodying instructions which, when executed, cause the computer to carry out the method, further comprising:
   maintaining a data structure of variant mappings, wherein the variant mappings include the variant mapping, and wherein the variant mapping comprises a second code point of the variant; and
   identifying, as a part of the selecting, and corresponding to the location, the variant in the variant mapping.

4. The non-transitory computer readable medium embodying computer readable instructions of claim 3 embodying instructions which, when executed, cause the computer to carry out the method, further comprising:
   determining that a language of the second code point corresponds to a region of the location.

5. The non-transitory computer readable medium embodying computer readable instructions of claim 1 embodying instructions which, when executed, cause the computer to carry out the method, wherein the textual character is also encoded using a first language tag, further comprising:
   maintaining a data structure of variant mappings, wherein the variant mappings include the variant mapping, and wherein the variant in the variant mapping comprises the code point and a second language tag; and
   identifying, as a part of the selecting, and corresponding to the location, the variant in the variant mapping.

6. The non-transitory computer readable medium embodying computer readable instructions of claim 5 embodying instructions which, when executed, cause the computer to carry out the method, further comprising:
   determining that a language of the second language tag corresponds to a region of the location.

7. The non-transitory computer readable medium embodying computer readable instructions of claim 1 embodying instructions which, when executed, cause the computer to carry out the method, wherein the character encoding standard is Unicode.

8. The non-transitory computer readable medium embodying computer readable instructions of claim 1 further embodying transferring instructions which, when executed, cause the computer to carry out the method further comprising:
   transferring over a network from a remote data processing system, the computer readable instructions; and
   storing, responsive to the transferring, the computer readable instructions in a data processing system.

9. The non-transitory computer readable medium embodying computer readable instructions of claim 1 further embodying downloading instructions which, when executed, cause the computer to carry out the method further comprising:

downloading, from a server data processing system where the computer usable instructions are stored, over a network to a remote data processing system, the computer readable instructions for use in a computer readable storage device associated with the remote data processing system.

10. A data processing system for dynamically changing a rendering of content, the data processing system comprising:

a storage device, wherein the storage device stores computer usable program code; and a processor, wherein the processor executes the computer usable program code, and wherein the computer usable program code comprises:

computer usable code for receiving, at a device, the content including a textual character, an encoding of the textual character using a first code point according to a character encoding standard;

computer usable code for detecting, at the device, that the device is present at a geographical location, the device being associated with a mobile user;

computer usable code for selecting, at the device, a variant selection rule, wherein the variant selection rule specifies a location based condition to select a variant corresponding to the textual character, wherein the variant conveys one of (i) a similar meaning in a different language than a language of the textual character, and (ii) has the same first code point but is associated with a different language than that of the textual character;

computer usable code for selecting, at the device, according to the variant selection rule, a variant mapping corresponding to the first code point, the variant mapping including the variant;

computer usable code for replacing, at the device, in the rendering of the content, the encoding of the textual character with an encoding of the variant.

11. The data processing system of claim 10, wherein the encoding of the textual character corresponds to a locale setting of the device, further comprising:

computer usable code for detecting that the device has moved to a second location;

computer usable code for receiving, at the second location, the content with the encoding of the textual character; and computer usable code for rendering the textual character as a second variant corresponding to the second location by replacing the encoding of the textual character with the encoding of the second variant.

12. The data processing system of claim 10, further comprising:

computer usable code for maintaining a data structure of variant mappings, wherein the variant mappings include the variant mapping, and wherein the variant mapping comprises a second code point of the variant; and computer usable code for identifying, as a part of the selecting, and corresponding to the location, the variant in the variant mapping.

13. The data processing system of claim 12, further comprising:

computer usable code for determining that a language of the second code point corresponds to a region of the location.

* * * * *